United States Patent
Perdices-Gonzalez et al.

(10) Patent No.: US 11,042,249 B2
(45) Date of Patent: Jun. 22, 2021

(54) IDENTIFYING USERS USING CAPACITIVE SENSING IN A MULTI-VIEW DISPLAY SYSTEM

(71) Applicant: Samsung Electronics Company, Ltd., Suwon si (KR)

(72) Inventors: Sergio Perdices-Gonzalez, Sunnyvale, CA (US); Nigel Clarke, Mountain View, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 0 days.

(21) Appl. No.: 16/712,718

(22) Filed: Dec. 12, 2019

(65) Prior Publication Data

US 2021/0026470 A1   Jan. 28, 2021

Related U.S. Application Data

(60) Provisional application No. 62/878,088, filed on Jul. 24, 2019.

(51) Int. Cl.
| | | |
|---|---|---|
| G06F 3/044 | (2006.01) | |
| G06F 3/041 | (2006.01) | |
| B60R 11/02 | (2006.01) | |

(52) U.S. Cl.
CPC .......... *G06F 3/044* (2013.01); *B60R 11/0235* (2013.01); *G06F 3/0416* (2013.01);
(Continued)

(58) Field of Classification Search
CPC .... G06F 3/0416; G06F 3/04166; G06F 3/044; G06F 3/0443; G06F 3/0445;
(Continued)

(56) References Cited

U.S. PATENT DOCUMENTS

| | | |
|---|---|---|
| 8,139,040 B2 | 3/2012 | Kong |
| 8,368,663 B2 | 2/2013 | Izadi |

(Continued)

FOREIGN PATENT DOCUMENTS

| | | |
|---|---|---|
| CN | 100594475 | 8/2008 |
| EP | 2757407 A1 | 7/2014 |

(Continued)

OTHER PUBLICATIONS

International Search Report and Written Opinion for International Application No. PCT/KR2020/009506, dated Oct. 26, 2020.

(Continued)

*Primary Examiner* — Nelson M Rosario
(74) *Attorney, Agent, or Firm* — Baker Botts L.L.P.

(57) ABSTRACT

In one embodiment, a method includes generating, at a multi-view display, a first content to be viewed at a first angle and a second content to be viewed at a second angle. The first content and the second content are displayed simultaneously. The method also includes receiving, at a touch-screen panel coupled to the multi-view display, a first plurality of capacitive signals. The method then generates, by the touch-screen panel, a first touch-screen panel heatmap based on the received first plurality of capacitive signals. The method afterwards determines, based on the first touch-screen panel heatmap, whether a first user input is received with respect to the first content or the second content. The method then assigns, based on determining the first user input corresponds to either the first content or the second content, the first user input to the first content or the second content.

20 Claims, 12 Drawing Sheets

(52) U.S. Cl.
CPC .................. *B60R 2300/207* (2013.01); *G06F 2203/04104* (2013.01)

(58) Field of Classification Search
CPC ......... G06F 3/0446; G06F 2203/04103; G06F 2203/04104; G06F 2203/04108; G06F 2203/04111
See application file for complete search history.

(56) References Cited

U.S. PATENT DOCUMENTS

| | | | |
|---|---|---|---|
| 8,614,688 | B2 | 12/2013 | Chang |
| 2007/0273670 | A1 | 11/2007 | Nordahl |
| 2007/0297064 | A1* | 12/2007 | Watanabe ............. G06F 3/0488 359/630 |
| 2008/0068284 | A1* | 3/2008 | Watanabe .......... G01C 21/3664 345/1.1 |
| 2009/0109126 | A1 | 4/2009 | Stevenson |
| 2009/0143141 | A1 | 6/2009 | Wells |
| 2009/0211817 | A1 | 8/2009 | Chang |
| 2011/0310050 | A1 | 12/2011 | Chiang |
| 2016/0054827 | A1 | 2/2016 | Mickelsen |
| 2018/0181245 | A1 | 6/2018 | Beck |
| 2019/0369801 | A1* | 12/2019 | Wilkinson ............. G06F 3/044 |
| 2020/0086817 | A1* | 3/2020 | Moseley ............. H04B 13/005 |
| 2020/0142582 | A1* | 5/2020 | Quinn ................ G06F 3/04883 |

FOREIGN PATENT DOCUMENTS

| | | |
|---|---|---|
| JP | 2005-284592 A | 10/2005 |
| JP | 2011-100337 A | 5/2011 |

OTHER PUBLICATIONS

Extended European Search Report for European Application No. 20186998.9, dated Dec. 15, 2020.

* cited by examiner

IDENTIFYING USERS USING CAPACITIVE SENSING IN A MULTI-VIEW DISPLAY SYSTEM

TECHNICAL FIELD

This disclosure generally relates to touch-screen panels in multi-view display systems.

BACKGROUND

Existing displays are generally designed for one-to-many experiences where a single image is broadcast to anyone who looks at the display. In scenarios where multiple people are viewing and interacting with a single display, the communication efficiency of one-to-many displays drop. For example, if multiple people are crowding around a conventional display then the display will present the same content to all users, limiting the relevance and value of the content. User interaction may also be an issue if the display is directed to an interface that can be used by multiple users. A multi-user interface may be cluttered or complex due to having all of the elements each user uses on one single display.

DESCRIPTION OF EXAMPLE EMBODIMENTS

Figure 1A:
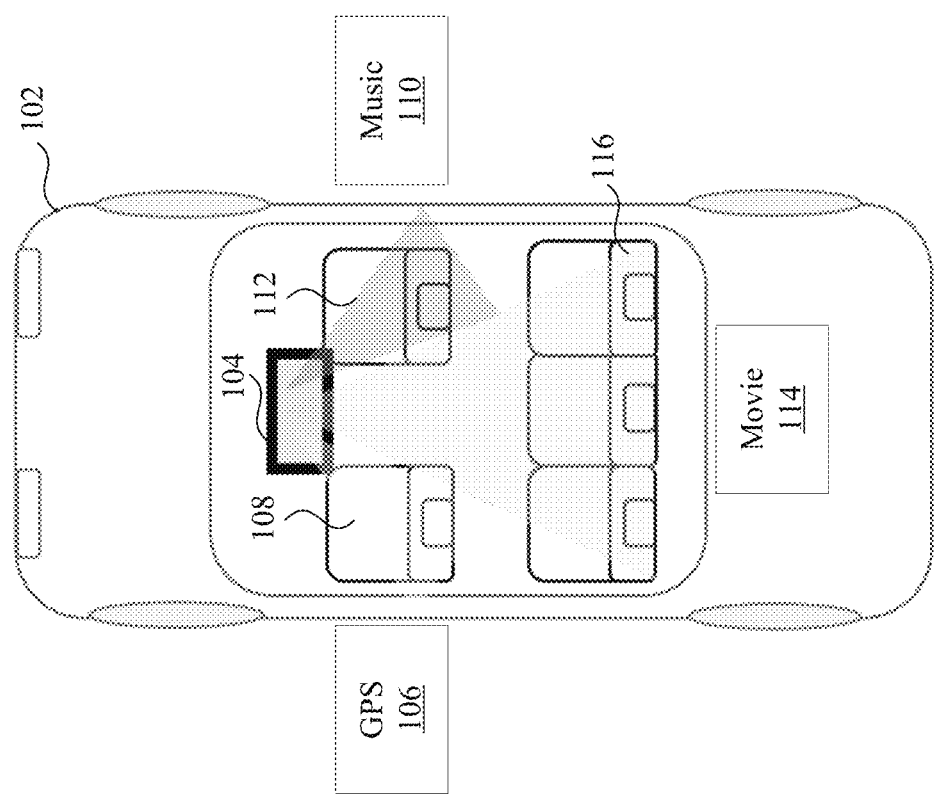
FIGS. 1A-1D illustrate an example multi-view display system with different content displayed at different viewing angles.

An electronic device of the present disclosure offers the ability to accurately map a user input to specific content displayed on a multi-view display. For example, the electronic device may be a multi-view display system that includes a multi-view display coupled to a touch-screen panel. Using the touch-screen panel, the device may be able to implement capacitive sensing to detect user inputs by measuring capacitive values through the touch-screen panel. As described herein, the device determines a direction associated with measured capacitive values and maps a user input to, e.g., a first content or a second content displayed on the multi-view display based on the determined direction. While certain embodiments of this disclosure describe a multi-view display showing a first content and a second content, as described more fully herein this disclosure contemplates a multi-view display that can provide any suitable separate or unique views of content, such as three views, four views, etc.

Multi-view displays may enable the display of various content to multiple users at the same time. This may help increase the relevance of the content to each user by increasing the available content. The multi-view display may render each content available and combine them using a rendering engine to generate a content package that displays different content at different angles. The implementation of the identification of users may enable users to navigate through their respective content (i.e., the content presented to each user's view) without disturbing content shown by other views of the multi-view display. For example, if a multi-view display is used within a vehicle, the driver may be presented directions using a global positioning system (GPS) for navigation and the passenger may be presented a music application for entertainment. By identifying the users and their respective interactions with the multi-view display, the users may be able to effectively navigate through their respective content (e.g., the driver through navigation settings and the passenger through the music application).

In order to accurately identify the user interacting with the multi-view display, a touch-screen panel may be used for capacitive sensing, where as a user comes into close proximity to the touch-screen panel, the touch-screen panel may receive capacitive values corresponding to the user (e.g., the user's hand, arm, etc.). These capacitive values may be used to generate a heatmap that indicates capacitive values corresponding to locations of the touch-screen panel. As used herein, a "heatmap" refers to any suitable characterization of capacitive values at points on the touch-screen panel's capacitive sensor and is not limited to, e.g., graphical representations of those values. The heatmap may associate a specific capacitive value to each location of the touch-screen panel. These heatmaps are used to determine which direction a user input is received. For example, when a user input is received, the touch-screen panel may generate a heatmap and identify the heatmap is approaching the multi-view display from the left side. By identifying the heatmap is coming from the left side, a determination may be made that the user input associated with the heatmap is coming from a user from the left side of the multi-view display (e.g., a driver in a vehicle). Thus, the user interaction may be associated specifically with content of a left-side view on the multi-view display while the interaction is ignored other views, such as, e.g., a right-side view on the multi-view display.

When discussing multi-view displays, any kind of multi-view display may be used and the multi-view display may comprise different components. For example a lenticular sheet, a parallax barrier, or a diffractive backlight may be used. The multi-view display may comprise different panel structures. For example, the multi-view display may have a stack comprising a display followed by a lens array and then a touch-screen panel. The multi-view display may have a different stack comprising a display followed by a touch-screen panel and then a lens array.

Unlike conventional multi-view displays, the multi-view display described herein is not limited to sectioning off areas of the display for particular users. For example, a user viewing the multi-view display from the left side may interact with the full display, such as touch an interactive element on the right side of the screen. The user-input interface for each view may overlap one another—i.e., may share the same physical space on the display—for example to maximize the user-input interface real estate for each user. This can reduce the clutter of the content displayed on the multi-view display by properly spacing out interactive elements of the user interface.

FIGS. 1A-1D illustrate an example multi-view display system with different content displayed at different viewing angles. Referring to FIG. 1A, a vehicle 102 is shown. The vehicle may comprise a multi-view display 104 that projects a navigation application 106 through a viewing angle 108, a music application 110 through a viewing angle 112, and a media-player application 114 through a viewing angle 116. Each of the viewing angles 108, 112, 114 may be determined to provide an optimal amount of maneuverability for each user to move around to interface the multi-view display 104. Each of the applications 106, 110, 114 may have their own corresponding user interface providing each user with a personalized interface experience. In particular embodiments, one or more of the applications 106, 110, 114 may have reduced or no user interface elements to interact with based on the viewing angle. For example, passengers in the rear of the vehicle may not have any access to the multi-view display 104 and therefore would not need any user interface elements, thus maximizing the media content 114 presented within the viewing angle 116. As noted above, each of applications 106, 110, 114 may be presented by user interfaces that overlap with each other on the physical space of multi-view display 104.

Figure 1B:
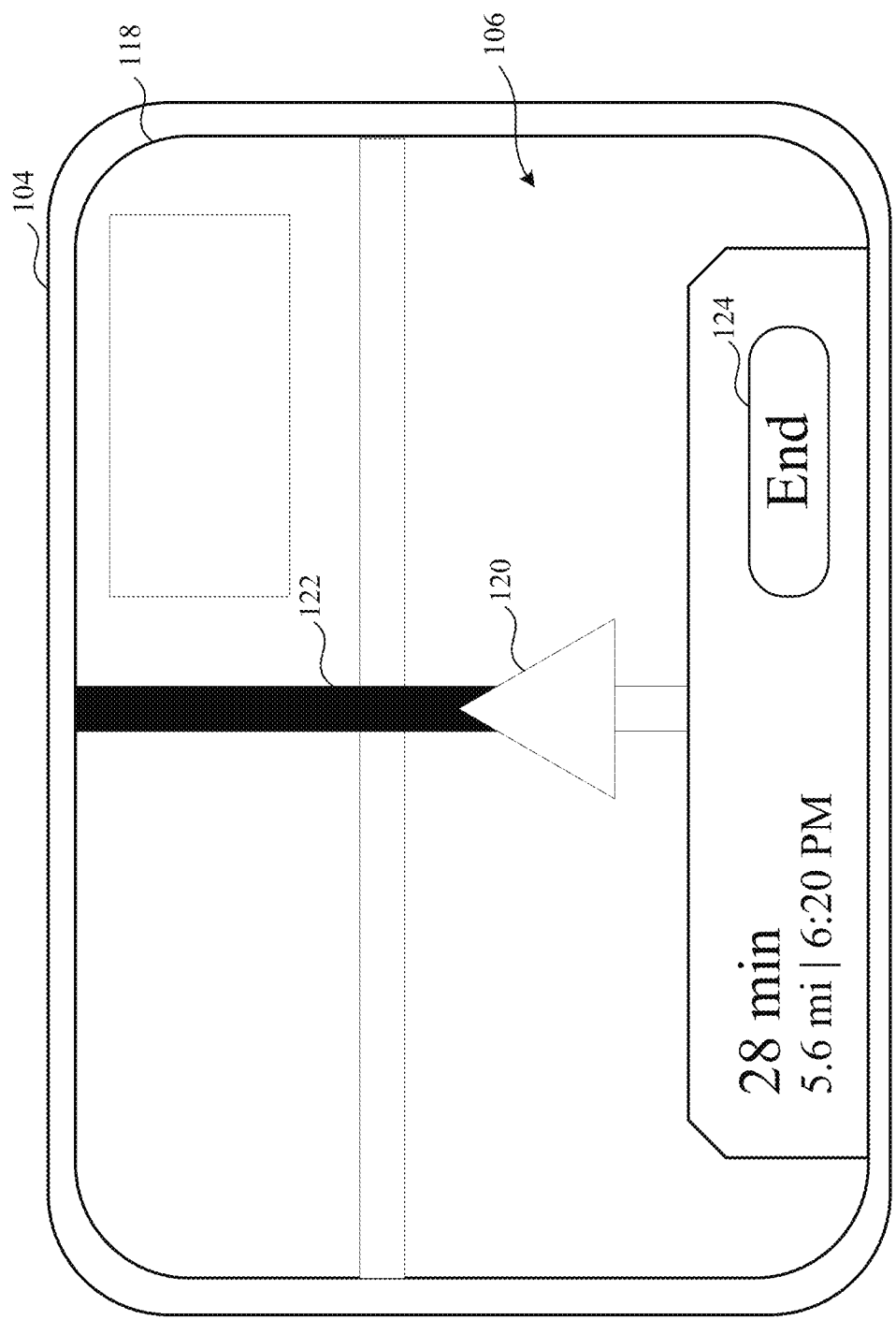

Referring to FIG. 1B, a user interface for a navigation application 106 is shown on the multi-view display 104. The multi-view display 104 may comprise or be coupled to a touch-screen panel 118 which may receive capacitive signals in response to users interacting with the multi-view display 104. In particular embodiments, only the user(s) within the viewing angle 108 may view and interface with the navigation application 106. The navigation application 106 may comprise an icon 120 representing the location of the user, a route 122, an interactive element 124 that ends the route 122 to a destination (not shown). Other elements of a navigation application may also be shown. The interactive element 124 may be presented only to the user looking at the multi-view display 104 from the viewing angle 108. As described more fully herein, interactive element 124 may only be activated or selected by the user looking at the multi-view display 104 from the viewing angle 108. As described above, from the perspective of a user within viewing angle 108, navigation application 106 appears to take up the entire physical display space of multi-view display 104.

Figure 1C:
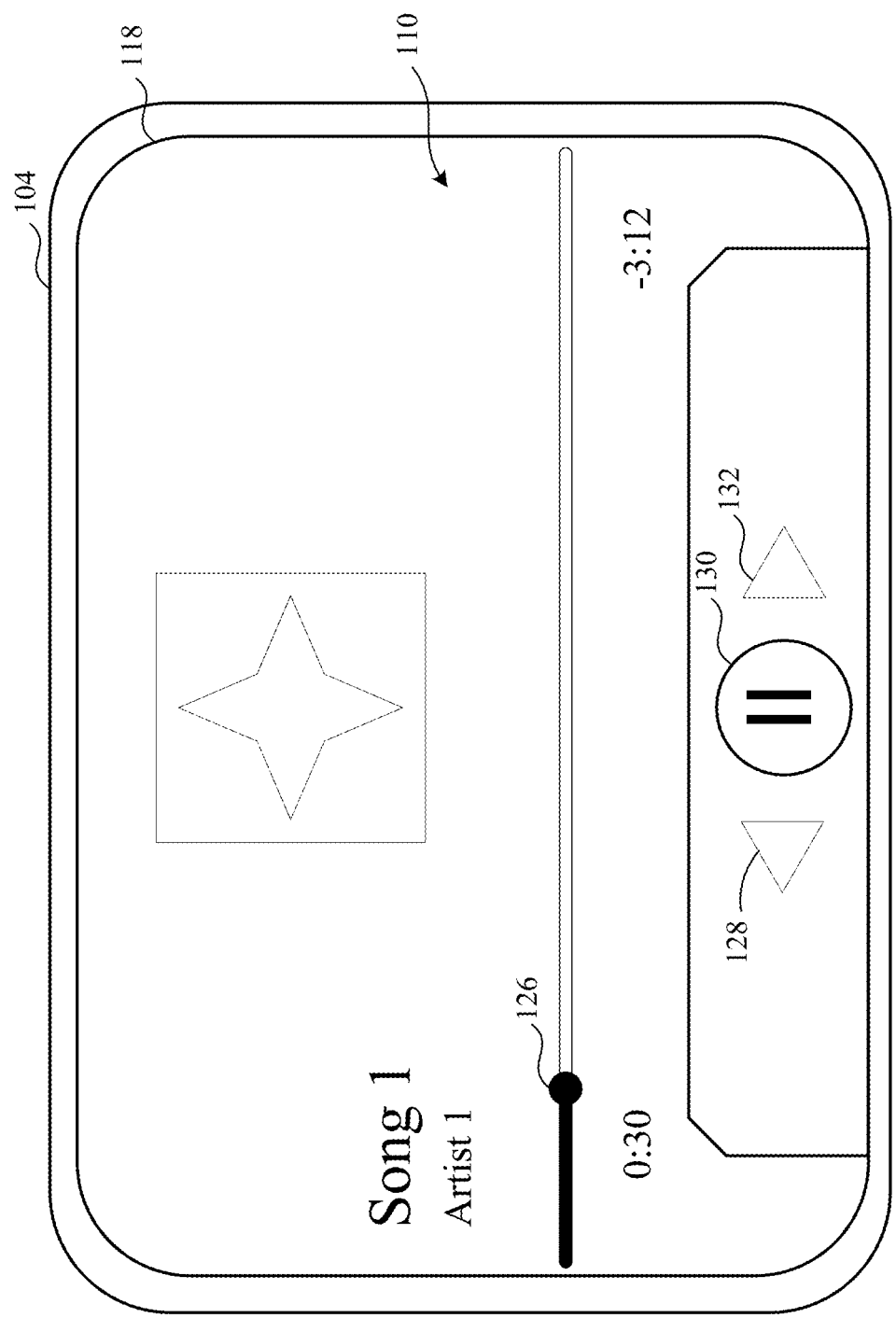

Referring to FIG. 1C, a user interface for a music application 110 is shown on the multi-view display 104. The multi-view display 104 may comprise or be coupled to a touch-screen panel 118 which may receive capacitive signals in response to users interacting with the multi-view display 104. In particular embodiments, only the user(s) within the viewing angle 112 may view and interface with the music application 110. The music application 110 may comprise a progress bar 126, an interactive element 128 to go to a previous song, an interactive element 130 to pause or play a song, and an interactive element 132 to go to a next song. Other elements of a music application may also be shown. The interactive elements 126, 128, 130, 132 may be presented only to the user looking at the multi-view display 104 from the viewing angle 112. The interactive elements 126, 128, 130, 132 may only be activated or selected by the user looking at the multi-view display 104 from the viewing angle 112.

Figure 1D:
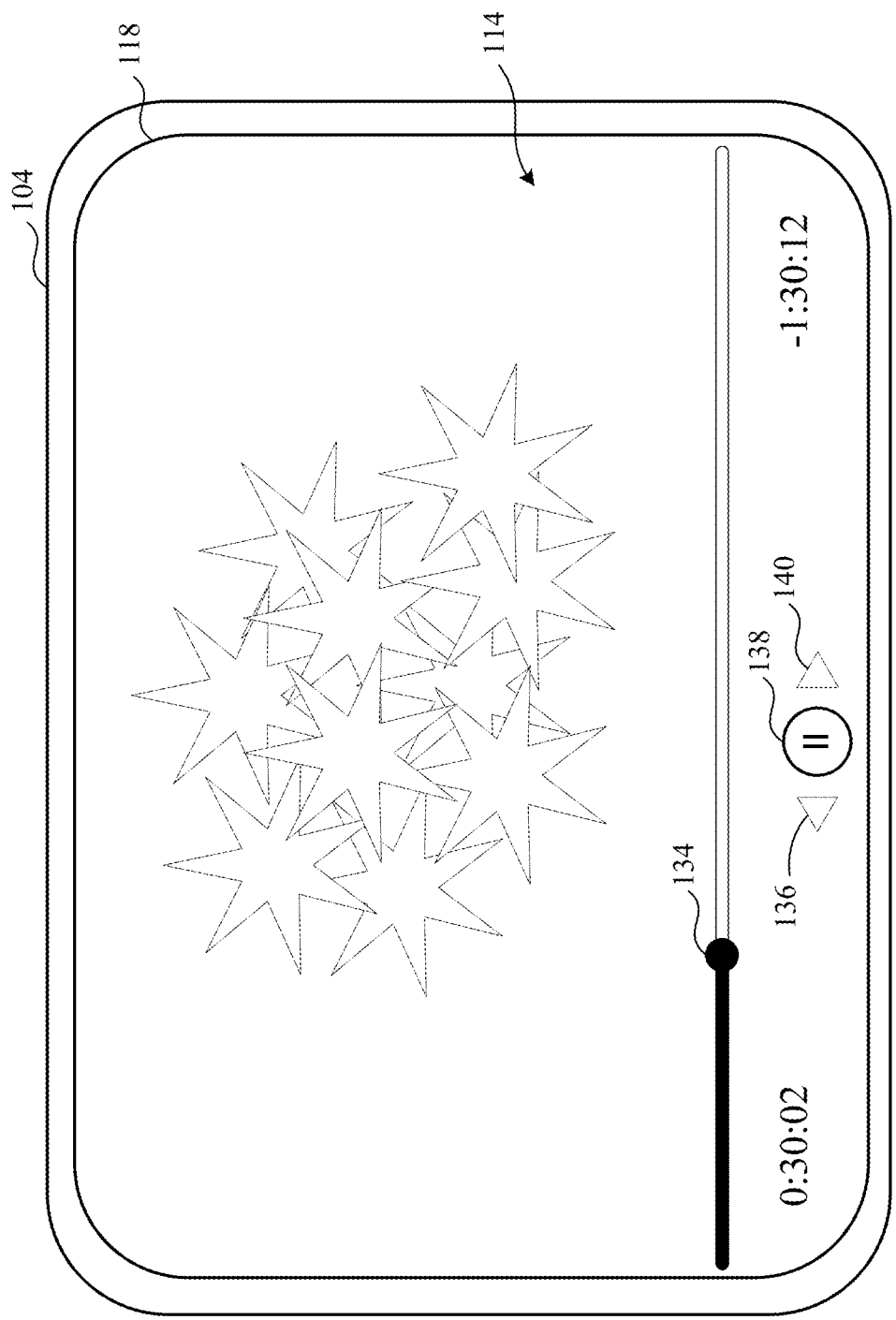

Referring to FIG. 1D, a user interface for a media-player application 114 is shown on the multi-view display 104. The multi-view display 104 may comprise or be coupled to a touch-screen panel 118 which may receive capacitive signals in response to users interacting with the multi-view display 104. In particular embodiments, only the user(s) within the viewing angle 114 may interface the media-player application 114. The media-player application 114 may comprise a progress bar 134, an interactive element 136 to go to a previous video, an interactive element 138 to pause or play a video, and an interactive element 140 to go to a next video. Other elements of a media-player application may also be shown. The interactive elements 134, 136, 138, 140 may be presented only to the user looking at the multi-view display 104 from the viewing angle 116. The interactive elements 134, 136, 138, 140 may only be activated or selected by the user looking at the multi-view display 104 from the viewing angle 116. Although media-player application 114 is presented with interactive elements 134, 136, 138, 140, the media-player application 114 may be presented without any interactive elements.

In particular embodiments, each application 106, 110, 114 may comprise an interactive element to switch content to a different application 106, 110, 114. For example the passenger may switch to the navigation application 106 to input new directions for the driver or change content in the media-player application 114. Moreover, while the example of FIG. 1A illustrates three views associated with three viewing angles 108, 112, and 116, this disclosure contemplates that more or fewer views may be associated with such viewing angles. For example, viewing angle 116 may itself be associated with three separate views: one for the view associated with the left-rear seat in FIG. 1A, one for the view associated with the middle-rear seat in FIG. 1A, and one for the view associated with the right-rear seat in FIG. 1A. Each of those views may be different than the views associated with viewing angles 108 and 112, for a total of 5 distinct views.

Figure 2:
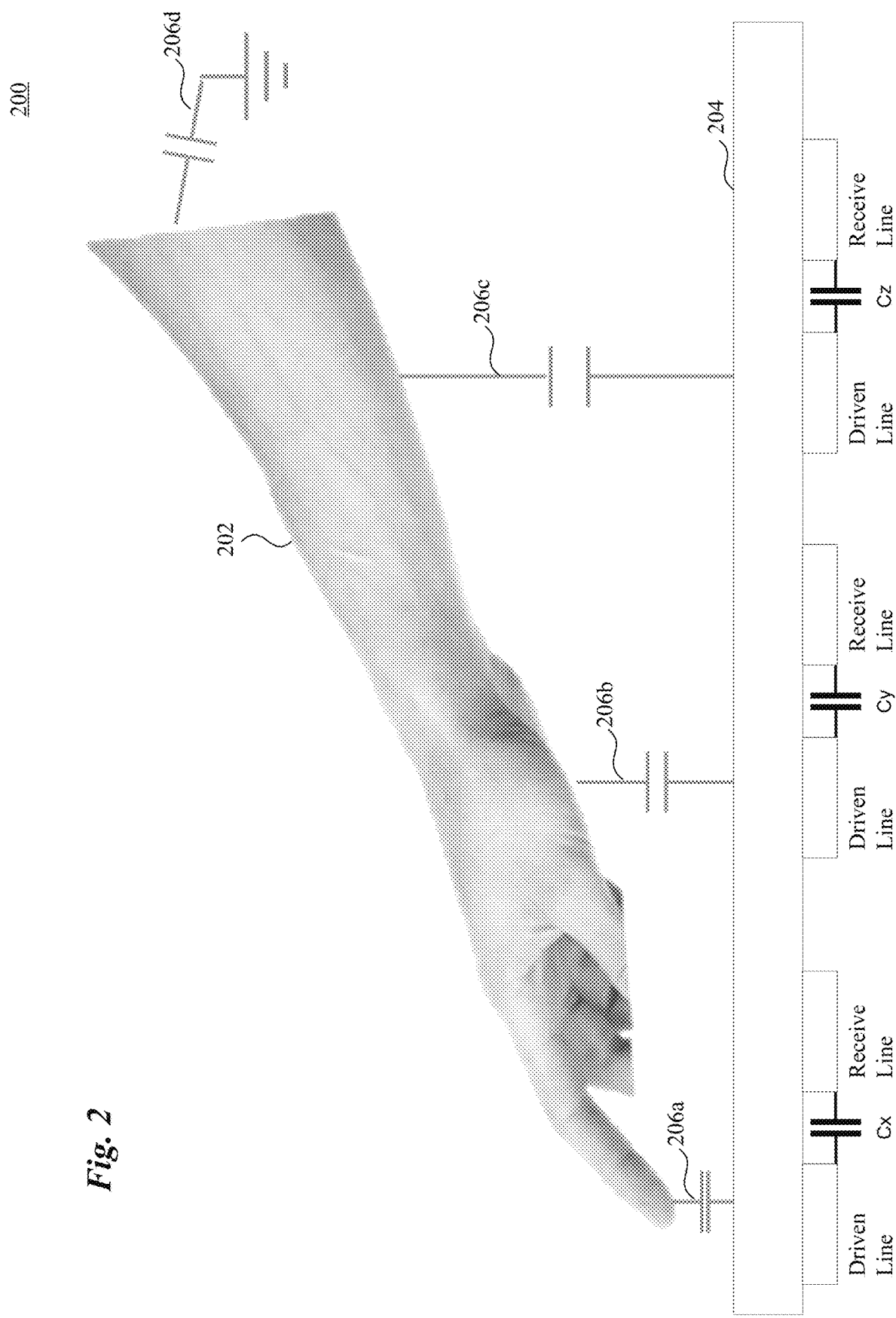
FIG. 2 illustrates an example of capacitive sensing using a touch-screen panel.

FIG. 2 illustrates an example of capacitive sensing 200 of a user 202 using a touch-screen panel 204 to detect capacitive values 206a, 206b, 206c, 206d. As a user 202 comes into contact with the touch-screen panel 204, the touch-screen panel 204 detects capacitive signals of varying capacitive values 206. As shown, the further away the user 202 is from the touch-screen panel 204, the larger the separation between the user 202 and the touch-screen panel 204, which affects the capacitive value 206 corresponding to the various locations of the touch-screen panel 204. The further away the user 202 is from the touch-screen panel 204, the touch-screen panel 204 is less likely to register any capacitive values. The capacitive sensing 200 is used to detect a direction a user 202 is coming from to interface the touch-screen panel 204. For example the capacitive sensing 200 may detect the user 202 is approaching the touch-screen panel from the right side.

Figure 3:
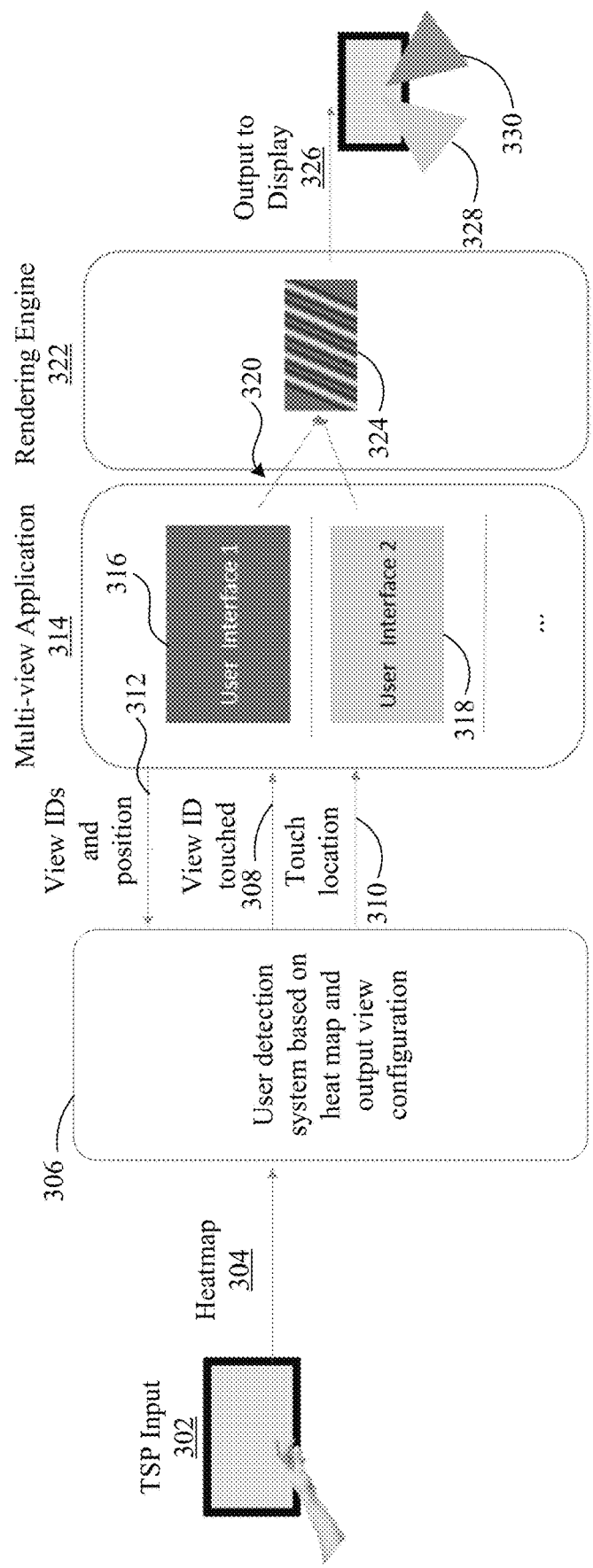
FIG. 3 illustrates an example process of receiving an input from a touch-screen panel connected to a multi-view display.

FIG. 3 illustrates an example process 300 of receiving an input 302 from a touch-screen panel connected to a multi-view display. The process 300 may begin with a touch-screen panel receiving a touch-screen input 302 from a user. For example, a user may come into close proximity of the touch-screen panel and touch the touch-screen panel at a location on the touch-screen panel to generate the touch-screen panel input 302. The touch-screen panel input 302 may be one or more capacitive signals. The touch-screen panel may receive the touch-screen panel input 302 and generate a heatmap 304 representing the locations of the touch-screen panel that corresponds to a received capacitive signal. The heatmap 304 is sent to the user detection system 306 to detect which user the touch-screen panel input 302 corresponds to as described herein.

The user detection system 306 may send a determination 308 of which view the touch-screen panel input 302 is associated with and a touch location 310 indicative of a position of the touch-screen panel that the touch-screen panel input 302 is received to a multi-view application 314. The multi-view application 314 may record information 312 of the view identifiers indicative of which content corresponds to which view angle and the interactive elements of the respective content. The multi-view application 314 may send the recorded information 312 to the user detection system 306 to ensure the user detection system 306 is using the most recent information 312 to accurately determine which user is looking at which content. The multi-view application 314 may generate a first user interface 316 that comprises a first content and a second user interface 318 that comprises a second content. The received touch-screen panel input 302 may alter a previously generated first user interface 316 or a previously generated second user interface 318. The alteration may cause the multi-view application 314 to send updated information 312 to the user detection system 306. The multi-view application 314 may send the data 320 associated with both of the user interfaces 316, 318 to the rendering engine 322. The rendering engine 322 generates a content package 324 to be displayed on the multi-view display. After generating the content package 324, the rendering engine sends an output 326 to the multi-view display, which presents the second user interface 318 to a user viewing the multi-view display at a first angle 328 and presents the first user interface 316 to a user viewing the multi-view display at a second angle 330.

Figure 4B:
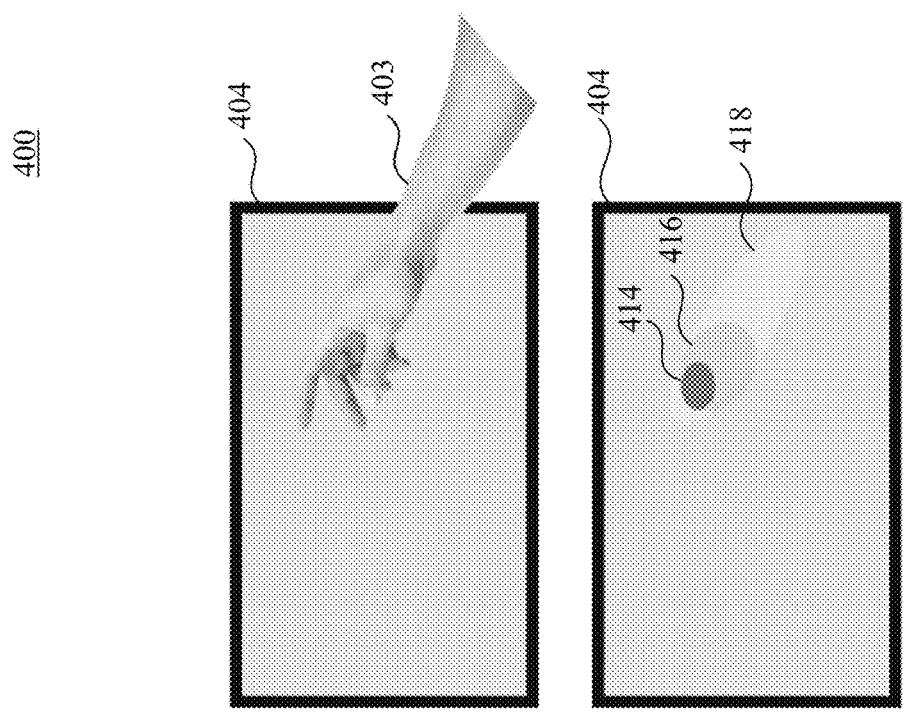
FIGS. 4A-4B illustrate an example user identification using capacitive sensing.
Figure 4A:
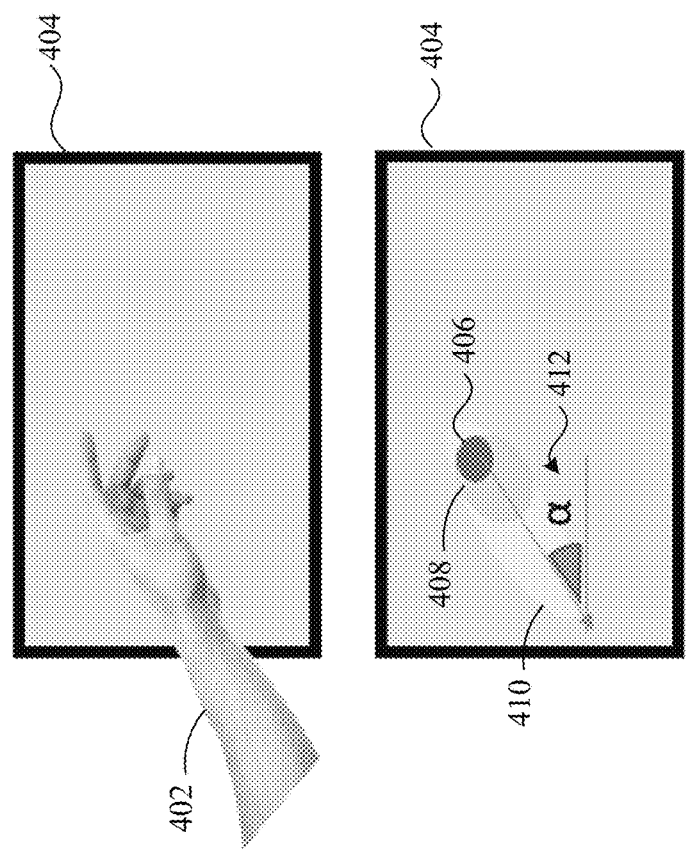

FIGS. 4A-4B illustrate an example user identification process 400 using capacitive sensing. Referring to FIG. 4A, in particular embodiments, a user 402 may approach a touch-screen panel 404 from a side (e.g., the left side). The touch-screen panel 404 may generate a heatmap indicative of the capacitive values of the received capacitive signals. In particular embodiments, the touch-screen panel 404 may take a snapshot of the capacitive signals at any given moment. In particular embodiments, the touch-screen panel 404 may take a snapshot of the capacitive signals in response to detecting a touch input 406. The touch input 406 may be a capacitive signal that exceeds a threshold capacitive value. In particular embodiments, the touch-screen panel 404 may use the heatmap to generate a capacitive shadow, which represents the capacitive signals captured in the snapshot. The capacitive shadow may comprise the touch input 406, a second level input 408 and a third level input 410.

The touch-screen panel 404 may determine an angle 412 the capacitive shadow has with respect to the touch-screen panel 404. The touch-screen panel 404 may use the capacitive shadow and the angle 412 in order to accurately determine which direction the user is coming from to input the touch input 406. By analyzing the capacitive shadow, the touch-screen panel 404 can determine that capacitive values are decreasing from the touch input 406 (dark=high capacitive value) to the second level input 408 (lighter=medium capacitive value) to the third level input 410 (light=low capacitive value. The pattern of the capacitive shadow may be used to indicate that a user's arm (e.g., user's finger) is touching the location associated with the touch input 406 and the arm is approaching the touch-screen panel 404 slightly at the angle 412 from the direction indicated by the second level input 408 and the third level input 410. The touch-screen panel 404 may determine that the user 402 is approaching the touch-screen panel 404 from the left side. The touch-screen panel 404 may map the touch input 406 to the content displayed on the multi-view display on the left side.

Referring to FIG. 4B, in particular embodiments, a user 403 may approach a touch-screen panel 404 from a side (e.g., right side). The touch-screen panel 404 may generate a heatmap indicative of the capacitive values of the received capacitive signals. In particular embodiments, the touch-screen panel 404 may take a snapshot of the capacitive signals at any given moment. In particular embodiments, the touch-screen panel 404 may take a snapshot of the capacitive signals in response to detecting a touch input 414. The touch input 414 may be a capacitive signal that exceeds a threshold capacitive value. In particular embodiments, the touch-screen panel 404 may use the heatmap to generate a capacitive shadow, which represents the capacitive signals captured in the snapshot. The capacitive shadow may comprise the touch input 414, a second level input 416 and a third level input 418. The touch-screen panel 404 may determine an angle (not shown) the capacitive shadow has with respect to the touch-screen panel 404.

The touch-screen panel 404 may use the capacitive shadow and the angle in order to accurately determine which direction the user is coming from to input the touch input 414. By analyzing the capacitive shadow, the touch-screen panel 404 can determine that capacitive values are decreasing from the touch input 414 (dark=high capacitive value) to the second level input 416 (lighter=medium capacitive value) to the third level input 418 (light=low capacitive value. The pattern of the capacitive shadow may be used to indicate that a user's arm (e.g., user's finger) is touching the location associated with the touch input 414 and the arm is approaching the touch-screen panel 404 slightly at the angle from the direction indicated by the second level input 416 and the third level input 418. The touch-screen panel 404 may determine that the user 403 is approaching the touch-screen panel 404 from the right side. The touch-screen panel 404 may map the touch input 414 to the content displayed on the multi-view display on the right side.

Figure 5:
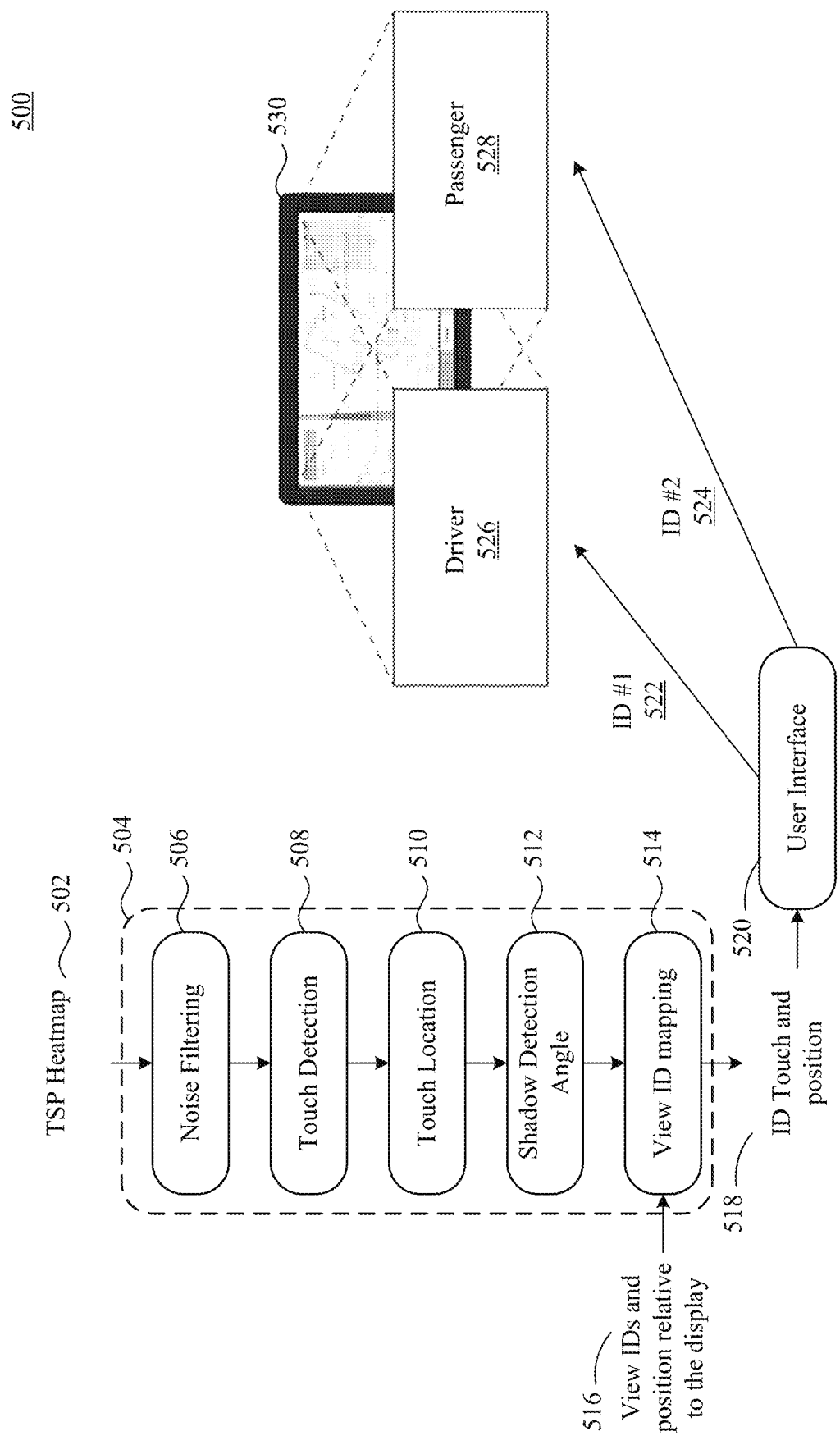
FIG. 5 illustrates an example flowchart of using capacitive sensing for user identification.

FIG. 5 illustrates an example flowchart of using capacitive sensing for user identification. The process 500 may begin with receiving a touch-screen panel heatmap 502 from a touch-screen panel. The touch-screen panel heatmap 502 is passed on to a shadow detection process 504 that initially performs noise filtering on the touch-screen panel heatmap 502 at step 506. After performing noise filtering, at step 508, touch detection is performed to determine a touch has been received. In particular embodiments, the touch detection determines whether a capacitive value exceeds a threshold capacitive value.

At step 510, a touch location is identified corresponding to the touch input. The touch-screen panel heatmap is used to identify a maximum capacitive value to correspond to the touch input. The touch-screen panel heatmap is then used to determine the touch location of that touch input. At step 512, a shadow angle is detected, which corresponds to an angle between a user that is inputting the touch input and the touch-screen panel. After a shadow angle is detected, the process 504 proceeds to determine which view the user input (e.g., touch input) corresponds to in step 514. The user input is mapped to a content or view displayed at a given viewing angle. Each content displayed on a multi-view display 530 may be given a view identifier to differentiate content from one another.

In order to determine which view identifier the user input is associated with, view identifiers and position relative to the display information 516 is used in the determination process of step 514. After determining a view identifier associated with the user input, the process 504 outputs an identifier and position 518 of the user input (e.g., touch input), which is sent to the user interface 520 that corresponds to driver content 526 or the passenger content 528 displayed on the multi-view display 530. The user input is sent to a corresponding user interface 520 based on whether the view identifier is for identifier #1 522 or for identifier #2 524. Once the corresponding user interface 520 is determined, the user input may be inputted into the user interface 520. The received user input may activate or select an interactive element within the respective content 526, 528.

Figure 6:
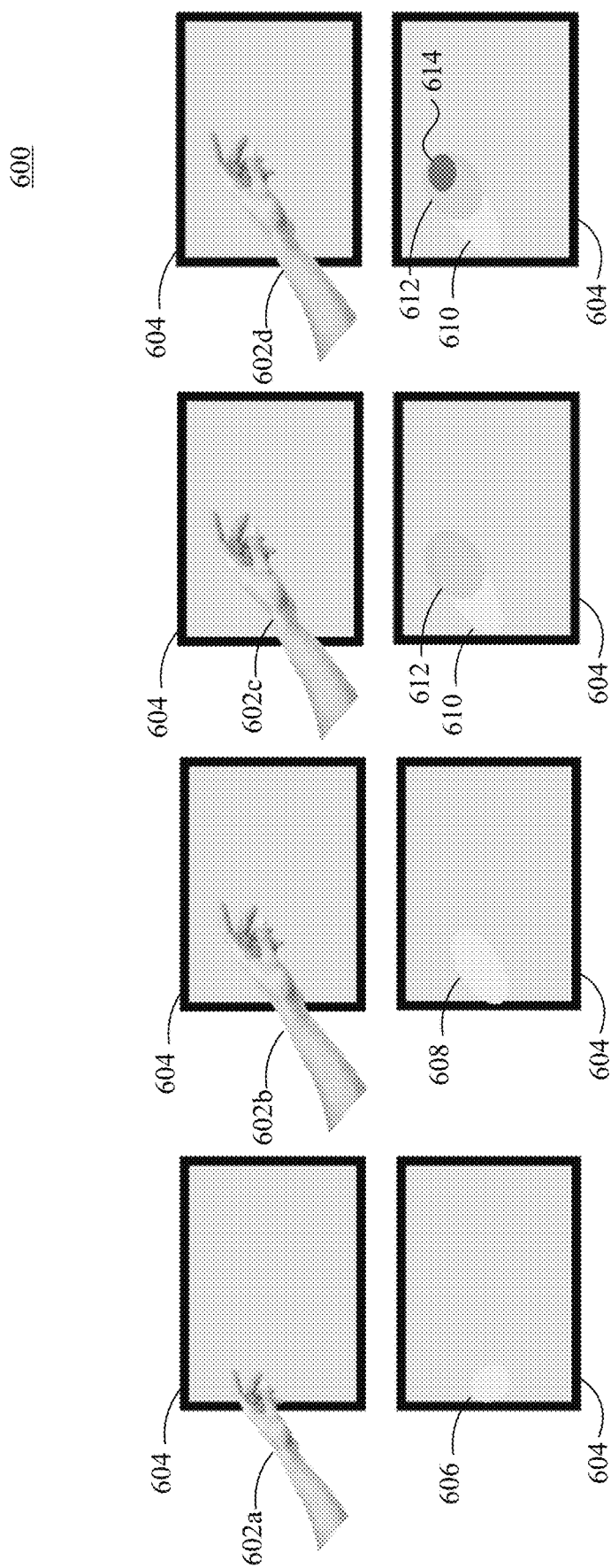
FIG. 6 illustrates an example user identification using motion tracking.

FIG. 6 illustrates an example process 600 of user identification using motion tracking. A user 602 may approach a touch-screen panel 604 from a side (e.g., a left side). The touch-screen panel 604 may generate a heatmap indicative of the capacitive values of the received capacitive signals. In particular embodiments, the touch-screen panel 604 may take a snapshot of the capacitive signals at any given moment. In particular embodiments, during the process 600, the touch-screen panel 604 may wait to receive any capacitive signal from a user 602. Once a capacitive signal is detected from a user at a first position 602*a*, the touch-screen panel 604 may record the capacitive signal and a corresponding timestamp until a user input is received (e.g., a touch input on the touch-screen panel). The touch-screen panel 604 may track the motion of a user 602 by recording the capacitive signals within a time interval.

As shown in FIG. 6, a user 602 may be reaching across the touch-screen panel 604 to input a user input on the touch-screen panel 604 at a particular location. The user 602 follows the path where the user 602 starts in a first position 602*a*, moves to a second position 602*b*, moves to a third position 602*c*, and finally ends at a fourth position 602*d*. As the user 602 makes his way across the touch-screen panel 604, the touch-screen panel 604 detects a third-level input 606 of a capacitive shadow when the user 602 is in a first position 602*a*. When the user 602 reaches a second position 602*b*, the touch-screen panel 604 detects a third-level input 608 that is slightly larger than the third-level input 606. When the user 602 reaches a third position 602*c*, the touch-screen panel 604 detects a third-level input 610 that is slightly larger than the third-level input 608 and detects a second-level input 612. When the user 602 reaches a fourth position 602*d*, the touch-screen panel 604 detects a third-level input 610 and second-level input 612 that is the same as the third position 602*c* and detects a touch input 614. The touch-screen panel may analyze the capacitive signal recordings and, in particular embodiments, associated time stamps, to determine a motion the user 602 followed to arrive at the touch input 614. The motion may be used to determine a direction the user 602 is coming from, which indicates a viewing angle of the user 602 and which content the user 602 is viewing. The touch-screen panel 604 may accordingly map the touch input 614 to the corresponding content (e.g., content viewed from the left side).

Figure 7:
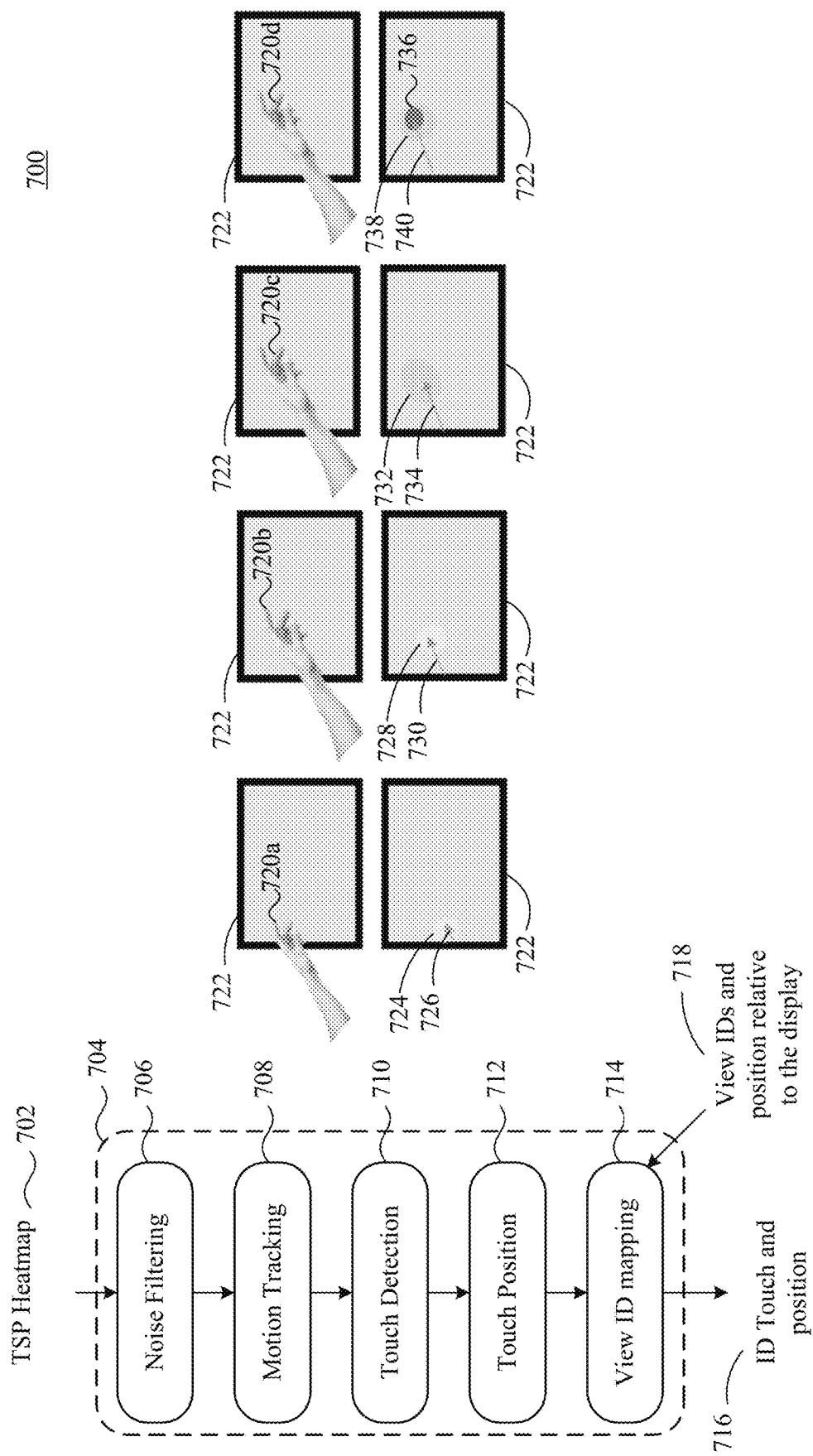
FIG. 7 illustrates an example flowchart of using motion tracking for user identification.

FIG. 7 illustrates an example flowchart of using motion tracking for user identification. The process 700 may begin with receiving a touch-screen panel heatmap 702 from a touch-screen panel. The touch-screen panel heatmap 702 is passed on to a motion tracking process 704 that initially performs noise filtering on the touch-screen panel heatmap 702 at step 706. After performing noise filtering, at step 708, motion tracking is initiated as capacitive signals are received, the motion tracking process 704 may record capacitive values with a timestamp. At step 710 touch detection is performed to determine a touch has been received. In particular embodiments, the touch detection determines whether a capacitive value exceeds a threshold capacitive value. At step 712, a touch position is identified corresponding to the touch input. The touch-screen panel heatmap is used to identify a maximum capacitive value to correspond to the touch input. The touch-screen panel heatmap is then used to determine the touch position of that touch input.

After a touch position is identified, the process 704 proceeds to determine which view the user input corresponds to in step 714. The user input (e.g., touch input) is mapped to a content or view displayed at a given viewing angle. Each content displayed on a multi-view display may be given a view identifier to differentiate content from one another. In order to determine which view identifier the user input is associated with, view identifiers and position relative to the display information 718 is used in the determination process of step 714. After determining a view identifier associated with the user input, the process 704 outputs an identifier and position 716 of the user input (e.g. touch input). The identifier and position 716 may be sent to a user interface that corresponds to content of the view identifier.

As shown in FIG. 7, a user 720 may be reaching across the touch-screen panel 722 to input a user input on the touch-screen panel 722 at a particular location. The user 720 follows the path where the user 720 starts in a first position 720*a*, moves to a second position 720*b*, moves to a third position 720*c*, and finally ends at a fourth position 720*d*. As the user 720 makes his way across the touch-screen panel 722, the touch-screen panel 722 detects a third-level input 724 of a capacitive shadow when the user 720 is in a first position 720*a*. The touch-screen panel 722 may generate a first vector 726 representing the motion of the user 720 with respect to the recorded capacitive signals in the first position 720*a*. When the user 720 reaches a second position 720*b*, the touch-screen panel 722 detects a third-level input 728 that is slightly larger than the third-level input 724. The touch-screen panel 722 may generate a second vector 730 representing the motion of the user 720 with respect to the recorded capacitive signals in the second position 720*b*. When the user 720 reaches a third position 720*c*, the touch-screen panel 722 detects a second-level input 732. The touch-screen panel 722 may generate a third vector 734 representing the motion of the user 720 with respect to the recorded capacitive signals in the third position 720*c*. When the user 720 reaches a fourth position 720*d*, the touch-screen panel 722 detects a touch input 736 and detects a second-level input 738. The touch-screen panel 722 may generate a fourth vector 740 representing the motion of the user 720 with respect to the recorded capacitive signals in the fourth position 720*d*. The touch-screen panel 722 may use the generated vectors 726, 730, 734, 740 to determine a motion followed by the user 720. The motion may be used determine a direction the user 720 is coming from, which indicates a viewing angle of the user 720 and which content the user 720 is viewing. The touch-screen panel 722 may accordingly map the touch input 736 to the corresponding content (e.g., content viewed from the left side).

Figure 8:
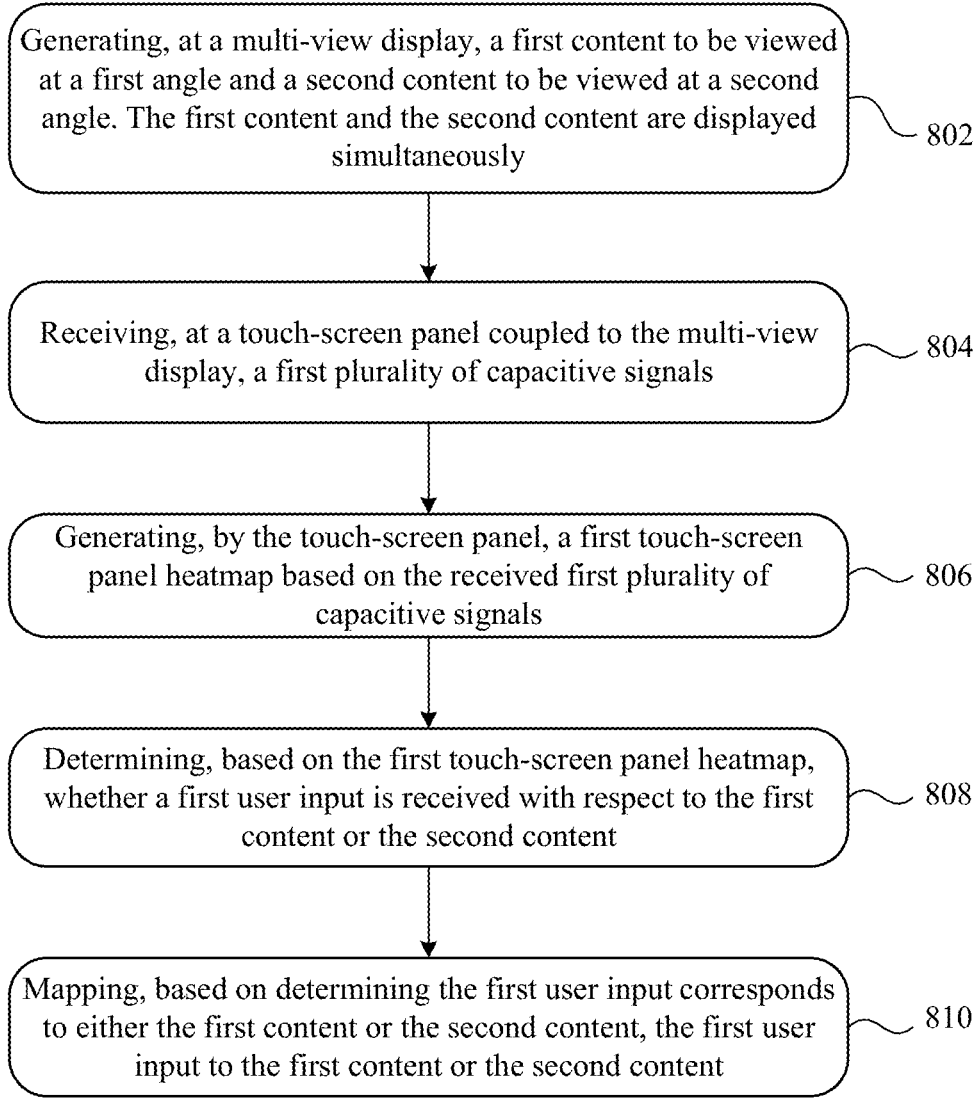
FIG. 8 illustrates an example method of mapping a user input to a content.

FIG. 8 illustrates an example method for mapping a user input to a content. At step 802, the method includes generating, at a multi-view display, a first content to be viewed at a first angle and a second content to be viewed at a second angle. As illustrated in step 802, the first content and the second content may be displayed simultaneously. At step 804, the method includes receiving, at a touch-screen panel coupled to the multi-view display, a first plurality of capacitive signals. At step 806, the method includes generating, by the touch-screen panel, a first touch-screen panel heatmap based on the received first plurality of capacitive signals. At step 808, the method includes determining, based on the first touch-screen panel heatmap, whether a first user input is received with respect to the first content or the second content. At step 810, the method includes mapping, based on determining the first user input corresponds to either the first content or the second content, the first user input to the first content or the second content.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for mapping a user input to a content, this disclosure contemplates any suitable method for mapping a user input to a content, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, a multi-view display system may comprise a multi-view display coupled to a touch-screen panel and a processor. Although steps described herein have been described as being performed by one part of the multi-view display system, the steps may be performed by any part of the multi-view display system.

In particular embodiments, once a multi-view display system receives a user input, the multi-view display system may identify which content the user input corresponds to. After the multi-view display system determines which content the user input corresponds to, the multi-view display system may map the user input to that content. Mapping the user input to the content may trigger any activatable elements of the content that are located in the position of the received user input. Multiple activatable elements from different content may be located in the same position on the multi-view display system. One user may see an end button for a navigation application and another user may see a play button for a music application.

In particular embodiments, the multi-view display system may determine one or more characteristics of a user interfacing the multi-view display system. For example, a user may be interacting with a large touch-screen panel that may receive capacitive signals of the user's entire body. In particular embodiments, the multi-view display system may use the received capacitive signals to determine characteristics of the user. For example, the multi-view display system may determine the user is a child or an adult based on height detection through with capacitive signals received from the user's body. The multi-view display system may determine the user is right handed or left handed, for example by determining the user's body position and the touch angle associated with a user's touch. For example, if the user's touch generates a heat map shown in FIG. 4A and that heat map is determined to be to on the left side of capacitive signals associated with the user's body, then the system may determine that a touch occurred with the user's left hand. The multi-view display system may modify the any of the displayed content based on the determined characteristics. For example, if a multi-view display system detects a child is viewing the multi-view display, the multi-view display system may customize the content suitable for the child.

This disclosure contemplates that a multi-view display system may take any suitable form to which the techniques disclosed herein for associating a particular user touch or user interaction (such as proximity) with a particular view may apply. For example, a multi-view display may be part of or placed on a horizontal surface such as a table. For example, a multi-view display may display a board game and may display four different views, one for each side of the typical board used in a board game. Each player's touch or hover interactions may be associated with that player's content using the techniques described herein. For example, a particular user's touch may execute functionality associated with that particular user's turn, or additionally or alternatively may display content for the view associated only with that user. As another example, a multi-view display may be a large surface, such as a white-board sized display mounted on a wall. The multi-view display may provide multiple views to different users. The number of views may scale with the size of the display, and as described herein, the granularity necessary to determine a particular touch with a particular view may depend on the number of views.

Figure 9:
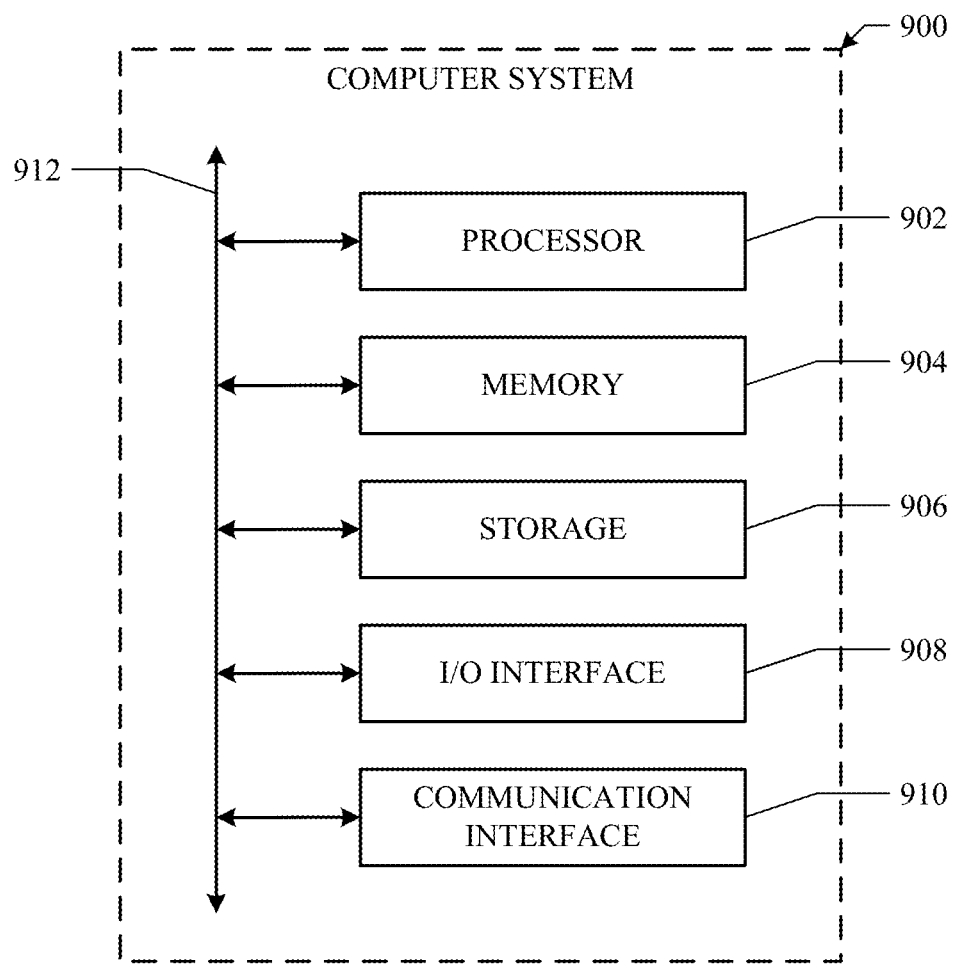
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    generating, at a multi-view display, a first content to be viewed at a first angle and a second content to be viewed at a second angle, wherein the first content and the second content are displayed simultaneously;
    receiving, at a touch-screen panel coupled to the multi-view display, a first plurality of capacitive signals associated with a first user input;
    generating, by the touch-screen panel, a first touch-screen-panel heatmap based on the received first plurality of capacitive signals associated with the first user input;
    determining, based on the first touch-screen-panel heatmap, whether the first user input corresponds to the first content or the second content;
    assigning, based on determining the first user input corresponds to either the first content or the second content, the first user input to the first content or the second content; and
    altering, based on the assignment of the first user input associated with the first touch-screen-panel heatmap to the first content or the second content, the first content or the second content, respectively.

2. The method of claim 1, further comprising:
    detecting that one of the one or more capacitive signals exceeds a threshold capacitive value, wherein the touch-screen panel heatmap is generated in response to detecting that the one of the one or more capacitive signals exceeds the threshold capacitive value.

3. The method of claim 1, wherein the first touch-screen-panel heatmap is indicative of capacitive values corresponding to a plurality of locations on the touch-screen panel.

4. The method of claim 1, wherein the first user input is a touch input received via the touch-screen panel.

5. The method of claim 1, further comprising:
    generating a capacitive shadow representing the first plurality of capacitive signals that correspond to a plurality of locations of the touch-screen panel based on the first touch-screen-panel heatmap;

identifying a direction associated with the capacitive shadow; and determining whether the direction corresponds to the first content or the second content.

6. The method of claim 5, further comprising:
determining that the direction corresponds to the first content; and
assigning the first user input to the first content in response to determining the direction corresponds to the first content.

7. The method of claim 5, further comprising:
determining that the direction corresponds to the second content; and
assigning the first user input to the second content in response to determining the direction corresponds to the second content.

8. The method of claim 1, wherein the first plurality of capacitive signals is received over a time interval.

9. The method of claim 8, further comprising:
generating, in response to receiving the first plurality of capacitive signals over the time interval, a vector corresponding to a motion detected from an order of when each of the first plurality of capacitive signals are received within the time interval;
identifying a direction associated with the vector; and
determining whether the direction corresponds to the first content or the second content.

10. The method of claim 9, further comprising:
determining that the direction corresponds to the first content; and
assigning the first user input to the first content in response to determining the direction corresponds to the first content.

11. The method of claim 9, further comprising:
determining that the direction corresponds to the second content; and
assigning the first user input to the second content in response to determining the direction corresponds to the second content.

12. The method of claim 1, wherein mapping the first user input to the first content or the second content comprises:
identifying a location of the touch-screen panel that corresponds to an activatable element corresponding to the first content or the second content; and
triggering the activatable element corresponding to the first content or the second content in response to assigning the first user input to the respective content.

13. The method of claim 1, further comprising:
determining one or more characteristics of a user associated with the first plurality of capacitive signals based on a plurality of locations of where the first plurality of capacitive signals is received with respect to the touch-screen panel; and
modifying the display of one or more of the first content or the second content based on the determined one or more characteristics.

14. The method of claim 1, further comprising:
generating a first interactive element at a location of the touch-screen panel, wherein the first interactive element corresponds to the first content, wherein the first user input is associated with the location of the touch-screen panel; and
generating a second interactive element at the location of the touch-screen panel, wherein the second interactive element corresponds to the second content, wherein the first user input triggers the first interactive element or the second interactive element based on the assignment of the first user input.

15. The method of claim 1, further comprising:
receiving a second plurality of capacitive signals;
generating a second touch-screen panel heatmap based on the received second plurality of capacitive signals; and
determining, based on the second touch-screen panel heatmap, whether a second user input corresponds to the first content or the second content.

16. The method of claim 15, further comprising:
identifying a first direction corresponding to the first user input, wherein the first direction is associated with the first content; and
identifying a second direction corresponding to the second user input, wherein the second direction is associated with the second content.

17. The method of claim 1, further comprising:
generating a content package that comprises the first content and the second content.

18. The method of claim 17, further comprising:
regenerating the content package in response to altering the first content or the second content, wherein the regenerated content package is displayed on the multi-view display.

19. An apparatus comprising:
a multi-view display;
a touch-screen panel coupled to the multi-view display; and
one or more non-transitory storage media embodying instructions and one or more processors operable to execute the instructions to:
generate, at the multi-view display, a first content to be viewed at a first angle and a second content to be viewed at a second angle, wherein the first content and the second content are displayed simultaneously;
receive, at the touch-screen panel, a first plurality of capacitive signals associated with a first user input;
generate, by the touch-screen panel, a first touch-screen-panel heatmap based on the received first plurality of capacitive signals associated with the first user input;
determine, based on the first touch-screen-panel heatmap, whether the first user input corresponds to the first content or the second content;
assign, based on determining the first user input corresponds to either the first content or the second content, the first user input to the first content or the second content; and
alter, based on the assignment of the first user input associated with the first touch-screen-panel heatmap to the first content or the second content, the first content or the second content, respectively.

20. One or more non-transitory computer-readable storage media embodying instructions that when executed by one or more processors cause the one or more processors to:
generate, at the multi-view display, a first content to be viewed at a first angle and a second content to be viewed at a second angle, wherein the first content and the second content are displayed simultaneously;
receive, at the touch-screen panel, a first plurality of capacitive signals associated with a first user input;
generate, by the touch-screen panel, a first touch-screen-panel heatmap based on the received first plurality of capacitive signals associated with the first user input;

determine, based on the first touch-screen-panel heatmap, whether the first user input is received with respect to the first content or the second content;

assign, based on determining the first user input corresponds to either the first content or the second content, the first user input to the first content or the second content; and alter, based on the assignment of the first user input associated with the first touch-screen-panel heatmap to the first content or the second content, the first content or the second content, respectively.

\* \* \* \* \*